United States Patent
Choi et al.

(10) Patent No.: US 12,320,526 B2
(45) Date of Patent: Jun. 3, 2025

(54) HOOD APPARATUS HAVING TEMPERATURE SENSING DEVICE AND TEMPERATURE SENSING METHOD

(71) Applicant: SAMSUNG ELECTRONICS CO., LTD., Suwon-si (KR)

(72) Inventors: Jungwon Choi, Suwon-si (KR); Yongkeun Jee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 310 days.

(21) Appl. No.: 17/869,497

(22) Filed: Jul. 20, 2022

(65) Prior Publication Data

US 2022/0357051 A1    Nov. 10, 2022

Related U.S. Application Data

(63) Continuation of application No. PCT/KR2022/004363, filed on Mar. 29, 2022.

(30) Foreign Application Priority Data

Mar. 29, 2021  (KR) .................. 10-2021-0040661

(51) Int. Cl.
*F24C 15/20*  (2006.01)
*G01J 5/00*  (2022.01)
(Continued)

(52) U.S. Cl.
CPC ........ *F24C 15/2021* (2013.01); *G01J 5/0044* (2013.01); *G01J 2005/0077* (2013.01); *G08B 3/00* (2013.01); *H04N 7/18* (2013.01)

(58) Field of Classification Search
CPC ......... G01J 5/0044; F24C 7/083; F24C 7/087; F24C 15/2021; F24C 15/00; F24C 15/2042; F24C 15/20

See application file for complete search history.

(56) References Cited

U.S. PATENT DOCUMENTS

| 9,109,805 B2 * | 8/2015 | Bach .................. F24C 15/2021 |
| 10,718,526 B2 * | 7/2020 | Neal ..................... F24C 7/083 |

(Continued)

FOREIGN PATENT DOCUMENTS

| AU | 2014241715 B2 * | 6/2018 | ............. F24C 3/124 |
| CN | 202328437 U | 7/2012 | |

(Continued)

OTHER PUBLICATIONS

International Search Report dated Jul. 22, 2022 issued in International Application No. PCT/KR2022/004363.

(Continued)

*Primary Examiner* — Gregory A Wilson
(74) *Attorney, Agent, or Firm* — STAAS & HALSEY LLP

(57) ABSTRACT

A hood apparatus for a cooking device includes at least one temperature sensor arranged in a direction of a cooking device including a plurality of burners, a communication interface to perform communication with the cooking device, a driving device configured to adjust a sensing direction of the at least one temperature sensor, and a processor configured to identify at least one burner being driven from among the plurality of burners, control the driving device to adjust the sensing direction of the at least one temperature sensor so that the at least one temperature sensor faces a position of the identified at least one burner, and control the communication interface to transmit a sensing result of the at least one temperature sensor to the cooking device.

15 Claims, 11 Drawing Sheets

(51) Int. Cl.
 *G08B 3/00* (2006.01)
 *H04N 7/18* (2006.01)

(56) References Cited

U.S. PATENT DOCUMENTS

| | | | |
|---|---|---|---|
| 10,935,252 B2* | 3/2021 | Norman | H05B 1/0266 |
| 11,506,540 B2* | 11/2022 | Hooker | G01J 5/52 |
| 2013/0187781 A1 | 7/2013 | Bach | |
| 2018/0224127 A1* | 8/2018 | Lambert | H05B 1/0266 |
| 2020/0011535 A1* | 1/2020 | Lambert | F24C 15/2042 |
| 2020/0041346 A1 | 2/2020 | Funk et al. | |
| 2022/0065457 A1* | 3/2022 | Bailey | H05B 3/746 |
| 2023/0152161 A1* | 5/2023 | Bruno | F24C 15/2021 374/128 |

FOREIGN PATENT DOCUMENTS

| | | | | |
|---|---|---|---|---|
| CN | 108253483 A | * | 7/2018 | |
| JP | 2004-95312 A | | 3/2004 | |
| JP | 2008215741 A | * | 9/2008 | |
| JP | 2009092338 A | * | 4/2009 | F24C 15/20 |
| JP | 4765647 B2 | | 9/2011 | |
| JP | 2015-106462 | | 6/2015 | |
| JP | 2017-040430 A | | 2/2017 | |
| KR | 10-2010-0010248 A | | 2/2010 | |
| KR | 20100010248 A | * | 2/2010 | |
| KR | 10-1111077 B1 | | 2/2012 | |
| KR | 10-2014-0077451 A | | 6/2014 | |
| KR | 10-1482117 | | 1/2015 | |
| KR | 101482117 B1 | * | 1/2015 | |
| KR | 10-1721541 B1 | | 3/2017 | |
| KR | 102238460 B1 | * | 4/2021 | |
| WO | WO 2019/203075 A1 | | 10/2019 | |
| WO | WO-2020078670 A1 | * | 4/2020 | F24C 15/2021 |

OTHER PUBLICATIONS

Written Opinion of the International Searching Authority dated Jul. 22, 2022 issue in International Application No. PCT/KR2022/004363.

Office Action dated Mar. 24, 2025 issued in Korean Patent Application No. 10-2021-0040661.

* cited by examiner ical and gas sure relates to a hood apparatus capable of sensing a

HOOD APPARATUS HAVING TEMPERATURE SENSING DEVICE AND TEMPERATURE SENSING METHOD

CROSS-REFERENCE TO RELATED APPLICATION(S)

This application is a bypass continuation of International Application No. PCT/KR2022/004363, filed on Mar. 29, 2022, which is based on and claims priority to Korean Patent Application No. 10-2021-0040661, filed on Mar. 29, 2021, in the Korean Intellectual Property Office, the disclosures of which are incorporated by reference herein in their entireties.

BACKGROUND

1. Field

The disclosure relates to a hood apparatus, a temperature sensing device attachable to the hood apparatus, and a temperature sensing method. More particularly, the disclosure relates to a hood apparatus capable of sensing a temperature of a cooking device spaced apart from the hood apparatus through a temperature sensing device attached to the hood apparatus, a temperature sensing device, and a temperature sensing method.

2. Description of Related Art

In the kitchen, cooking devices such as electric and gas ranges that heat a cooking container or food using one or more burners to perform a cooking operation, and various kitchen appliances such as a hood apparatus for absorbing smoke/odor generated during a cooking process and discharging it to the outside, or the like, are used.

When cooking food through a cooking device, it is an important factor in the cooking process to appropriately manage a temperature of the food being cooked, a cooking container, and a burner of the cooking device. Accordingly, there is a user's need for a method capable of measuring a temperature simply and accurately in the cooking device.

SUMMARY

The disclosure is to solve the problem described above, and an object of the disclosure is to sense a temperature of an object on a cooking device in a non-contact manner through a temperature sensing device attached to a hood apparatus. Further, the disclosure is to provide a temperature sensing device capable of sensing temperatures corresponding to positions of a plurality of burners arranged at different positions in the cooking device by using a single temperature sensing device, and a temperature sensing method.

According to an embodiment of the disclosure, a hood apparatus for a cooking device includes at least one temperature sensor arranged in a direction of a cooking device including a plurality of burners, a communication interface to perform communication with the cooking device, a driving device configured to adjust a sensing direction of the at least one temperature sensor, and a processor configured to identify at least one burner being driven from among the plurality of burners, control the driving device to adjust the sensing direction of the at least one temperature sensor so that the at least one temperature sensor faces a position of the identified at least one burner, and control the communication interface to transmit a sensing result of the at least one temperature sensor to the cooking device.

The hold apparatus further comprises a main body. The at least one temperature sensor may be attachable to or detachable from the main body of the hood apparatus, and the main body of the hood apparatus includes at least one connector to fix the at least one temperature sensor thereto.

The hood apparatus further may include a distance sensing sensor configured to sense a distance between the at least one temperature sensor and each of the plurality of burners of the cooking device, the processor is configured to update the sensing result sensed by the at least one temperature sensor according to the distance sensed by the distance sensing sensor.

The hood apparatus further may include a camera to photograph the plurality of burners of the cooking device, wherein the processor is configured to identify the at least one burner being driven among the plurality of burners based on an image photographed by the camera, and control the driving device to adjust the sensing direction of the at least one temperature sensor to face the position of the identified at least one burner.

The processor may receive information about a driving state of the plurality of burners from the cooking device through the communication interface, identify the at least one burner being driven based on the received information, and control the driving device to adjust the sensing direction of the at least one temperature sensor to face the position of the identified at least one burner.

The hood apparatus further may include a speaker, wherein the processor is configured to control the speaker to output a notification message in response to the updated sensing result being exceeding a threshold temperature.

The processor may determine a number of the at least one burner being driven in the cooking device, control the driving device to adjust the at least one temperature sensor to sequentially and repeatedly sense each of the plurality of burners being driven in response to the determining that the number of the at least one burner being driven is a greater than a number of the at least one temperature sensor.

According to an embodiment of the disclosure, a cooking device includes a plurality of burners arranged in different positions, a communication interface to perform communication with an external temperature sensor, and a processor configured to identify at least one burner being driven among the plurality of burners, and control the communication interface to transmit a control signal to adjust a sensing direction of the external temperature sensor so that the external temperature sensor faces a position of the identified at least one burner, and to control, in response to receiving a sensing result from the external temperature sensor, a driving state of the identified at least one burner according to the sensing result.

The processor may further update the sensing result based on a distance between each of the plurality of burners and the external temperature sensor, and control the driving state of the burner being driven based on the updated sensing result.

The cooking device may further include a speaker, wherein the processor is further configured to control the speaker to output a notification message in response to the updated sensing result being exceeding a threshold temperature.

According to an embodiment of the disclosure, a temperature sensing method of a temperature sensing device of a hood apparatus may include identifying, by a processor, at least one burner being driven from among a plurality of burners of a cooking device which is located apart from the temperature sensing device, adjusting a temperature sensor of the temperatures sensing device to face a position of the identified at least one burner, and transmitting a sensing result of the temperature sensor to the cooking device.

The method may further include sensing a distance between the temperature sensor and the identified at least one burner, and updating a sensing result sensed by the temperature sensor according to the sensed distance.

The method may further include photographing, by a camera of the temperature sensing device, the plurality of burners of the cooking device, and the identifying comprising identifying the at least one burner being driven from among the plurality of burners based on the photographed image.

The method may further include receiving information on driving states of the plurality of burners from the cooking device, and the identifying comprising identifying the at least one burner being driven based on the received information.

The method may further include determining a number of the at least one burner being driven in the cooking device, adjusting the at least one temperature sensor to sequentially and repeatedly sense each of the plurality of burners being driven in response to the determining that the number of the at least one burners being driven is a greater than a number of the at least one temperature sensor.

The at least one temperature sensor may be an infrared temperature sensor.

The temperature sensing device may be configured to divide a sensing area into pixel areas and determine a temperature value by calculating an average value of sensing values for the pixel area positioned in a center of the at least one burner.

The method may further comprises dividing a sensing area into pixel areas, and determining a temperature value by calculating an average value of sensing values for the pixel area positioned in a center of the at least one burner.

DETAILED DESCRIPTION

Figure 1:
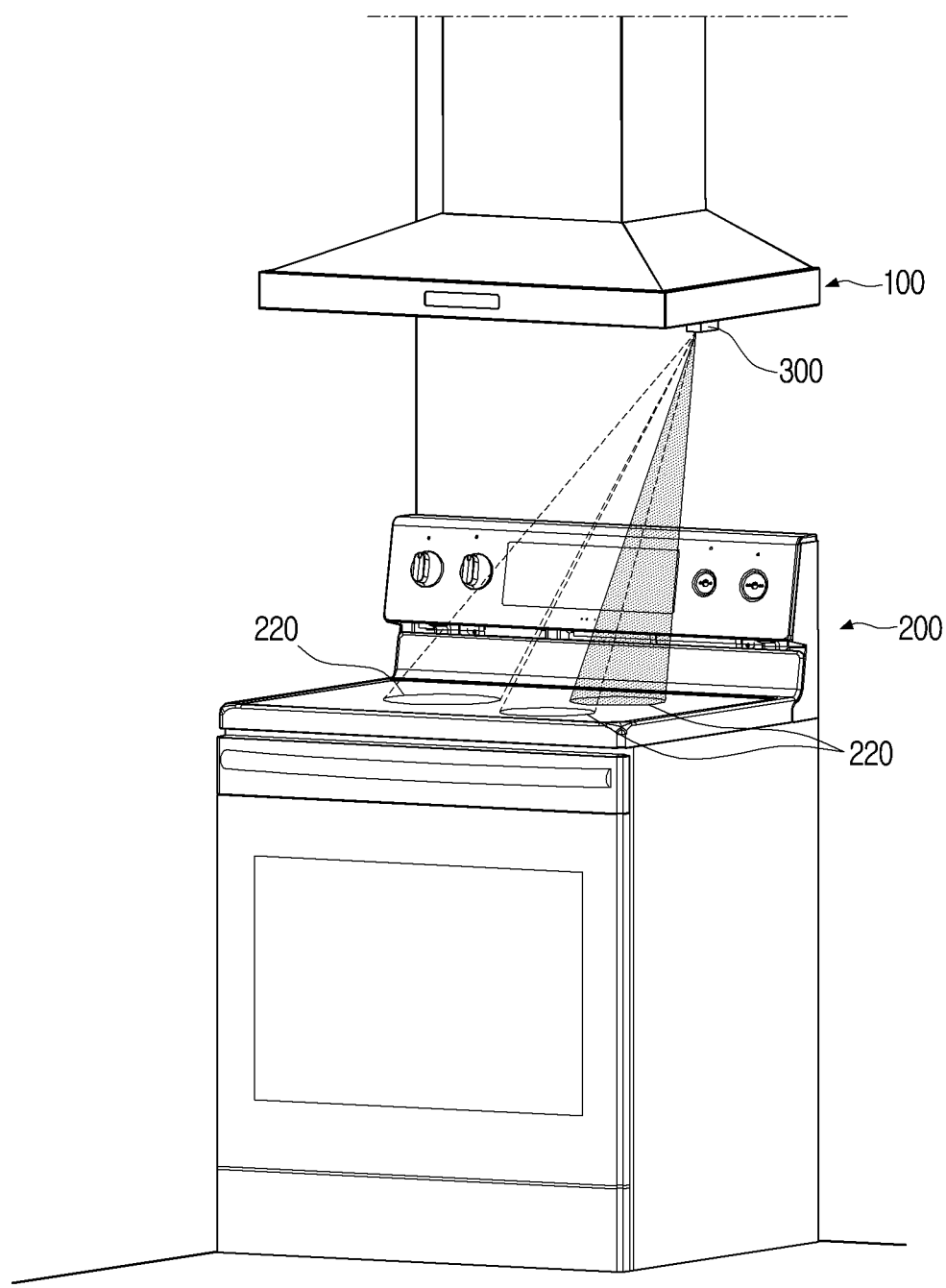
FIG. 1 is a perspective view schematically illustrating a hood apparatus, a cooking device, and a temperature sensing device attached to the hood apparatus according to an embodiment.

In the following description, same drawing reference numerals are used for the same elements even in different drawings. In the following description, well-known functions or constructions are not described in detail since they would obscure the invention in unnecessary detail. Further, dimensions of various elements in the accompanying drawings may be arbitrarily increased or decreased for assisting in a comprehensive understanding.

The terms used in the disclosure and the claims are general terms selected in consideration of the functions of the various example embodiments of the disclosure. However, such terms may be varied depending on an intention of those skilled in the art, a legal or technical interpretation, an emergence of a new technology, or the like. Also, there may be some terms arbitrarily selected by an applicant. Such terms may be construed according to meanings defined in the present specification, and may also be construed based on general contents of the present specification and a typical technical concept in the art unless the terms are not specifically defined.

In the description of the disclosure, the order of each operation should be understood as non-limiting unless a preceding operation must be logically and temporally performed before a subsequent operation. In other words, except for the exceptional cases described above, even if the process described as a subsequent operation is performed before the process described as a preceding operation, an essence of the disclosure is not affected, and the scope of rights should also be defined regardless of the order of the operations.

In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

The terms such as "first," "second," and so on may be used to describe a variety of elements, but the elements should not be limited by these terms. The terms are only used to differentiate one component from other components. For example, the 'first' component may be named the 'second' component, and vice versa, without departing from the scope of the disclosure.

In addition, since the disclosure describes elements required for the description of each embodiment of the disclosure, the disclosure is not limited thereto. Accordingly, some elements may be changed or omitted, and other elements may be added. In addition, they may be distributed and arranged in different independent devices.

Further, an embodiment of the disclosure will be described in detail below with reference to the accompanying drawings and descriptions described in the accompanying drawings, but the disclosure is not limited or limited by the embodiments.

Hereinafter, the disclosure will be described in detail with reference to the drawings.

Figure 2:
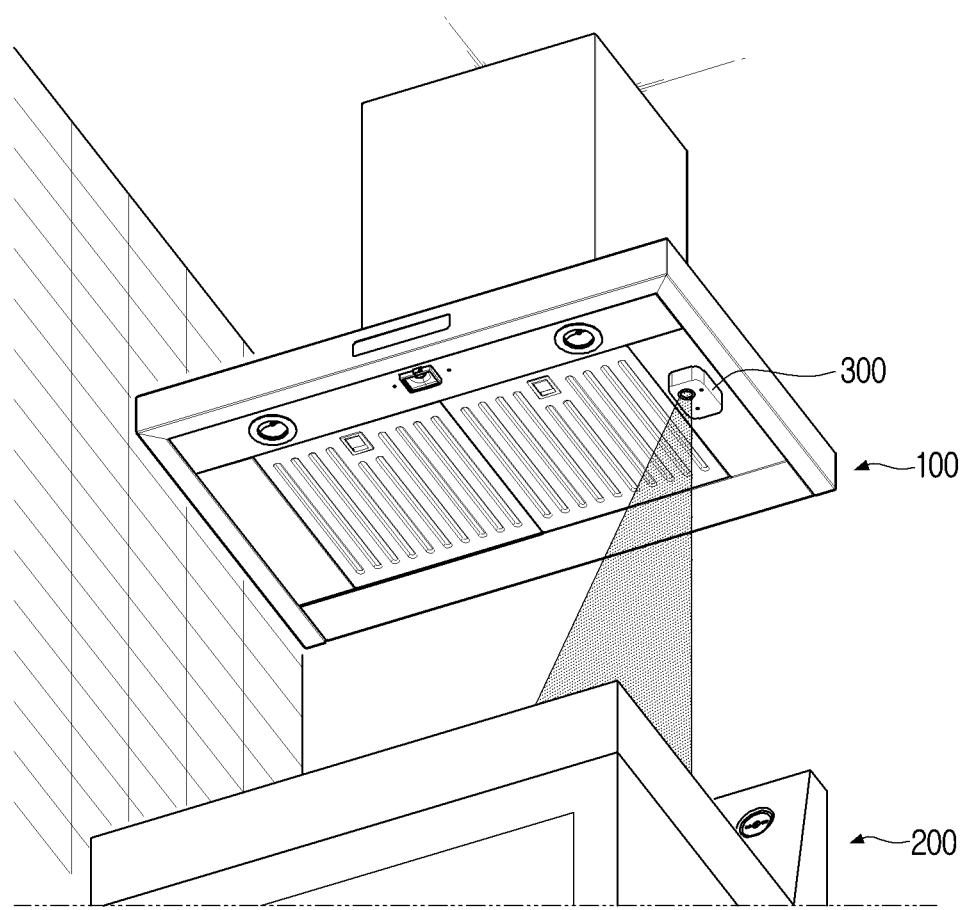
FIG. 2 is a perspective view illustrating a temperature sensing device attached to a bottom surface of a cooking device according to an embodiment.

FIG. 1 is a perspective view schematically illustrating a hood apparatus, a cooking device, and a temperature sensing device attached to the hood apparatus according to an embodiment, and FIG. 2 is a perspective view illustrating a temperature sensing device attached to a bottom surface of a cooking device according to an embodiment.

A cooking device 200 is a device that performs various cooking operations by applying high-temperature heat generated using electricity or gas to food, and may be implemented as an induction burner, an electric range, a gas range, or the like. Also, the cooking device 200 may be implemented as a cooktop including a combination of various cooking devices such as an induction burner, an electric range, a gas range, an oven, or the like.

A hood apparatus 100 may be arranged to be spaced apart from the cooking device 200, and may absorb smoke, cooking steam, cooking odor, or the like generated during a cooking process using the cooking device 200. In FIG. 1, the hood apparatus 100 is illustrated as being arranged above the cooking device 200, but a location of the hood apparatus 100 is not limited thereto, and may also be implemented in a down draft method that absorbs smoke in a downward direction by being arranged on an upper side of the cooking device 200.

A temperature sensing device 300 may be connected to the hood apparatus 100 to measure a temperature of a cooking container, cooking substance (food), a burner, or the like, arranged on an upper plate of the cooking device 200. The temperature sensing device 300 may sense a temperature of an object arranged on the cooking device 200 spaced apart from the hood apparatus 100 without contact through a non-contact infrared temperature sensor.

The cooking device 200 may include at least one burner 220.

When the cooking device 200 includes one burner, the temperature sensing device 300 may be arranged such that a sensing direction of a temperature sensor is directed toward the burner, and sense a temperature of the burner or a temperature of the cooking container and food arranged on the burner.

Meanwhile, the cooking device 200 may include a plurality of burners arranged at different positions, and a plurality of temperature sensing devices 300 arranged such that a sensing direction is directed toward each of the plurality of burners may be connected to the hood apparatus 100. In other words, as many temperature sensing devices 300 as the number of burners included in the cooking device 200 may be arranged in the hood apparatus 100. This is the same as sensing the temperature of one burner using one temperature sensing device 300 described above, the plurality of temperature sensing devices 300 may sense a temperature by being matched 1:1 to each burner. Accordingly, it is unnecessary to adjust a position or sensing direction of the temperature sensing device 300 after connecting the temperature sensing device 300 to the hood apparatus 100.

Meanwhile, according to an embodiment of the disclosure, temperatures of a plurality of burners arranged at different positions may be sensed through one temperature sensing device 300. Specifically, an arrangement of the temperature sensing device 300 may be changed to face a sensing direction corresponding to each burner by changing a position where the temperature sensing device 300 is attached to the hood apparatus 100 or rotating the temperature sensing device 300 in the attached position. Accordingly, since the temperatures of the plurality of burners may be sensed using one temperature sensing device 300, a cost may be reduced compared to arranging the temperature sensing device 300 for each burner. In addition, the user's convenience may be improved by automatically changing the sensing direction of the temperature sensing device 300 by identifying a burner being operated.

A detailed description of an operation of sensing the temperatures of the plurality of burners through one temperature sensing device 300 will be described below with reference to the drawings.

Figure 3:
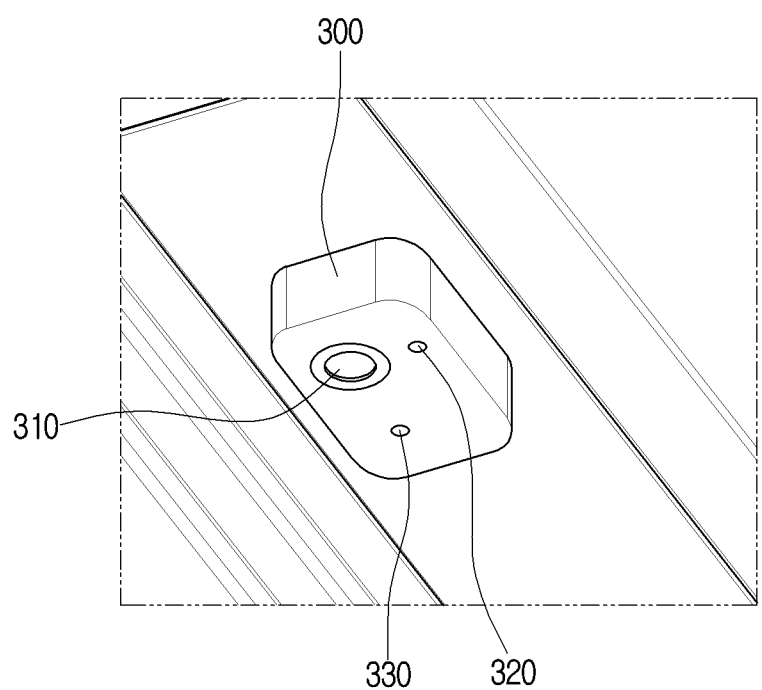
FIG. 3 is an enlarged view of a temperature sensing device of FIG. 2.

FIG. 3 is an enlarged view of a temperature sensing device of FIG. 2.

Referring to FIG. 3, the temperature sensing device 300 may include a temperature sensor 310, a laser pointer 320, and an LED indicator 330. FIGS. 1 to 3 illustrate that the temperature sensing device 300 is a separate detachable device detachable from the hood apparatus 100, but elements included in the temperature sensing device 300 may be implemented by being embedded in the hood apparatus 100.

The temperature sensor 310 is a sensor for measuring a temperature of a cooking container, a temperature of food in the container, and a temperature of a burner of the cooking device 200. The temperature sensor 310 may be implemented as an infrared temperature sensor that measures temperature in a non-contact manner.

The laser pointer 320 may display a position where a temperature is sensed by the temperature sensor 310 by irradiating a laser in a sensing direction of the temperature sensor 310.

The LED indicator 330 may display various states of the temperature sensing device 300. For example, the LED indicator 330 may indicate a power state of the temperature sensing device 300, a communication connection state with an external device, or the like, through an operation of emitting different colors of light or flashing lights according to the state of the temperature sensing device 300.

In addition, the temperature sensing device 300 may further include a distance sensing sensor, a camera, a driving device, or the like. A detailed description in this regard will be described below in FIG. 6 with reference to an embodiment in which the temperature sensor 120 is provided in the hood apparatus 100.

Figure 4:
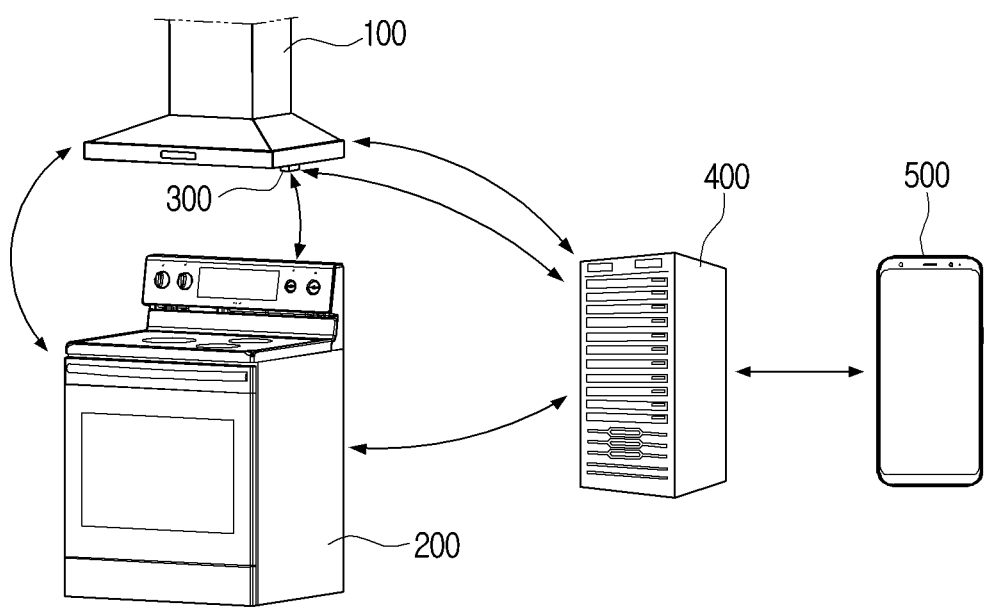
FIG. 4 is a view illustrating an operation in which a hood apparatus, a cooking device, and the hood apparatus communicate with an external device according to an embodiment.

FIG. 4 is a view illustrating an operation in which a hood apparatus, a cooking device, and the hood apparatus communicate with an external device according to an embodiment.

Referring to FIG. 4, a hood apparatus 100, a cooking device 200, a temperature sensing device 300, a server 400, and the user terminal device 500 may use a communication interface provided therein, or may communicate with each other through a communication interface of the other device.

The communication interface may communicate with external devices through a local area network (LAN), Internet network, and mobile communication network, and also communicate with an external device through various communication methods such as Bluetooth (BT), Bluetooth Low Energy (BLE), Wireless Fidelity (WI-FI), Wireless Fidelity direct (WI-FI Direct), ZigBee, NFC, or the like. To that purpose, the communication interface may include various communication modules to perform network communication. For example, the communication interface may include a Wi-Fi chip, a Bluetooth chip, a wireless communication chip, or the like.

When the temperature sensing device 300 is implemented in a form detachable to the hood apparatus 100 and has its own communication interface, the temperature sensing device 300 may directly communicate with the cooking device 200 to transmit and receive information. For example, the temperature sensing device 300 may transmit a sensing value sensed through the temperature sensor to the cooking device 200, and receive information about a burner being operated, a control signal for changing a sensing direction, or the like, from the cooking device 200. For example, the temperature sensing device 300 may perform communication with the cooking device 200 by being connected to the cooking device 200 via Bluetooth.

Meanwhile, the temperature sensing device 300 may be connected to the hood apparatus 100 by wire or wirelessly to communicate with the hood apparatus 100, and when the temperature sensing device 300 does not include its own communication interface, the temperature sensing device may communicate with an external device through a communication interface of the hood apparatus 100. For example, the temperature sensing device 300 may transmit a sensing value of the temperature sensor to the hood apparatus 100, and the hood apparatus 100 may transmit the sensed value through the communication interface to the other device such as the cooking device 200, the server 400, and the user terminal device 500.

The server 400 may refer to an electronic device that collects and processes data of an external device. For example, the server 400 may be implemented as a device that performs a function dedicated to a server, such as a cloud server, or the like, but also various electronic devices such as a smartphone, tablet, wearable device, PC, or the like capable of performing the function of the server together with the other functions. However, this is only an example, and the server 400 may be implemented with various types of electronic devices not listed here. Also, the server 400 may be implemented as a single device or as an aggregate comprising a plurality of devices. For example, the server 400 may be a server that provides a SmartThings service.

The user terminal device 500 is a device capable of performing various functions, such as providing information to the user or receiving a user command, and may be various electronic devices such as a smartphone, a tablet, a wearable device, a PC, or the like.

The user terminal device 500 may control functions of the hood apparatus 100, the cooking device 200, and the temperature sensing device 300 through the server 400.

For example, the user terminal device 500 may transmit a control command for controlling the hood apparatus 100, the cooking device 200, or the like, to the hood apparatus 100 or the cooking device 200 through the server 400, or may be transmitted directly thereto such that a cooking operation is performed according to various cooking recipe information provided by the server 400.

Figure 5:
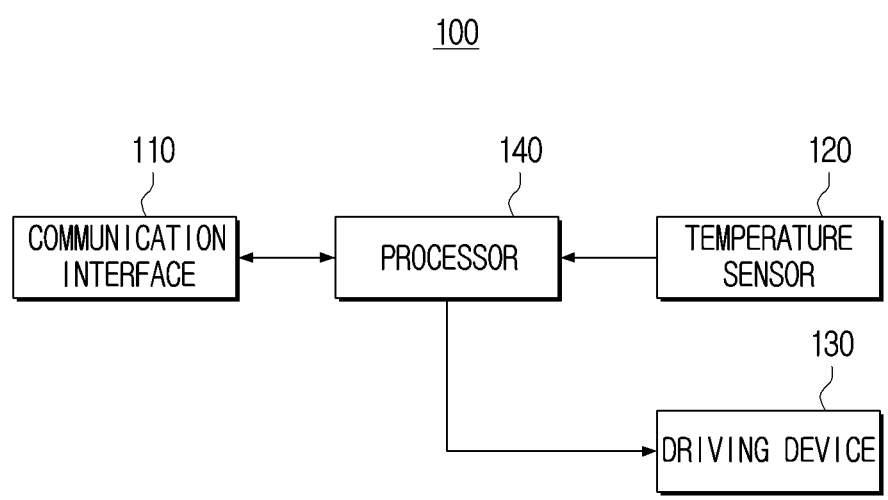
FIG. 5 is a block diagram illustrating a configuration of a hood apparatus according to an embodiment.

FIG. 5 is a block diagram illustrating a configuration of a hood apparatus according to an embodiment.

Referring to FIG. 5, the hood apparatus 100 includes a communication interface 110, a temperature sensor 120, a driving device 130, and a processor 140.

The communication interface 110 may transmit/receive various information by performing communication with an external device. The hood apparatus 100 may communicate with various external devices such as the cooking device 200, the server 400, and the user terminal device 500 through the communication interface 110. In addition, when the temperature sensing device 300 is provided with an independent communication interface in a configuration separate from the hood apparatus 100, the hood apparatus 100 may communicate with the temperature sensing device 300 through the communication interface 110 in a wire or wireless communication method. Since the communication operations of the hood apparatus 100, the cooking device 200, and the temperature sensing device 300 have been described in detail with reference to FIG. 4, a redundant description will be omitted.

The temperature sensor 120 is a sensor for measuring a temperature of a cooking container, a temperature of food in the container, and a temperature of a burner of the cooking device 200. The temperature sensor 120 may be implemented as an infrared temperature sensor that measures temperature in a non-contact manner.

The temperature sensor 120 may be arranged to face the cooking device 200 including a plurality of burners. Here, the temperature sensor 120 may be an element embedded in the hood apparatus 100, but may also be an element included in the temperature sensing device 300 detachable from the hood apparatus 100. Hereinafter, the temperature sensor 120 will be described as a configuration provided in the hood apparatus 100, but the description of the temperature sensor 120 may be equally applied to a temperature sensor 310 (refer to FIG. 3) included in the temperature sensing device 300.

The temperature sensor 120 may be implemented to be detachable to a main body of the hood apparatus 100, and the main body of the hood apparatus 100 may include a connector for fixing the temperature sensor 120. The connector may be implemented in various ways for fixing the temperature sensor 120 to a bottom surface of the hood apparatus 100, such as a hook fastening method, a magnet attachment method, or the like.

Meanwhile, the temperature sensor 120 may be arranged on an edge of the bottom surface of the hood apparatus 100. Accordingly, it is possible to prevent a sensing operation of the temperature sensor 120 from being disturbed by smoke generated in the cooking device 200 and absorbed into a central area of the hood apparatus 100.

When the cooking device 200 includes a plurality of burners, the hood apparatus 100 may include a plurality of temperature sensors 120 corresponding to each of the plurality of burners to sense a temperature for each of the plurality of burners.

Meanwhile, according to an embodiment of the disclosure, a temperature may be sensed for the plurality of burners using one temperature sensor 120.

When measuring a temperature of the cooking device 200 including a plurality of burners using one temperature sensor 120, a sensing direction of the temperature sensor 120 may be adjusted to face a position of any one of the plurality of burners through the driving device 130 of the temperature sensor 120.

The driving device 130 may adjust the sensing direction of the temperature sensor 120. The driving device 130 may adjust the sensing direction of the temperature sensor 120 by rotating the temperature sensor 120 through a driving source such as a motor connected to the temperature sensor 120.

The driving device 130 may adjust the sensing direction of the temperature sensor 120 to face a position of a burner that is a temperature sensing object among the plurality of burners. Here, the burner to be the temperature sensing object may be determined by receiving an input from the user, receiving information on a driven burner from the cooking device 200, or identifying the driven burner through a sensor.

As an example, the processor 140 may receive information on a driving state of the plurality of burners from the cooking device 200 through the communication interface 110, identify a burner driven based on the received information, and control the driving device 130 such that the sensing direction of the temperature sensor 120 faces a position of the burner identified as being driven.

In addition, the processor 140 may control a camera 170 to photograph the cooking device 200, identify a burner being driven among the plurality of burners based on the image photographed by the camera 170, and control the driving device 130 such that the sensing direction of the temperature sensor 130 faces the position of the burner identified as being driven.

In addition, if the number of burners being driven in the cooking device 200 is greater than the number of temperature sensors 120, the processor 140 may control the driving device 130 such that the temperature sensor 120 sequentially and repeatedly senses each of the burners being driven.

Meanwhile, it has been described as an example that the driving device 130 adjusts a sensing direction of the temperature sensor 120 by driving it through a driving source such as a motor, but the sensing direction of the temperature sensor 120 may be adjusted by an external force without the driving source. For example, the temperature sensor 120 may be connected to a connector rotatable in various directions, and may be implemented in a form that can be rotated or adjusted in direction by an external force applied by the user.

The processor 140 may be electrically connected to the communication interface 110, the temperature sensor 120, and the driving device 130, and may control the overall operation of the hood apparatus 100.

According to an embodiment of the disclosure, when at least one of the plurality of burners 220 included in the cooking device 200 is driven, the processor 140 may control the driving device 130 such that at least one temperature sensor 120 faces a position of the at least one burner 220 driven in the cooking device 200, and control the communication interface 110 to transmit a sensing result sensed by the at least one temperature sensor 120 to the cooking device 200.

The cooking device 200 may control a cooking operation performed by the cooking device 200 according to the sensing result received from the hood apparatus 100. For example, the cooking device 200 may control an intensity of flame power of a burner or control a cooking time according to a temperature value for each burner included in the sensing result. Also, the cooking device 200 may provide a preheating completion notification at a preheating completion time point according to a temperature value of a cooking container, that is, when the cooking container reaches a preheating object temperature. Furthermore, the cooking device 200 may provide a high temperature risk notification when the temperature value of the burner is equal to or greater than a threshold value after cooking is finished.

Figure 6:
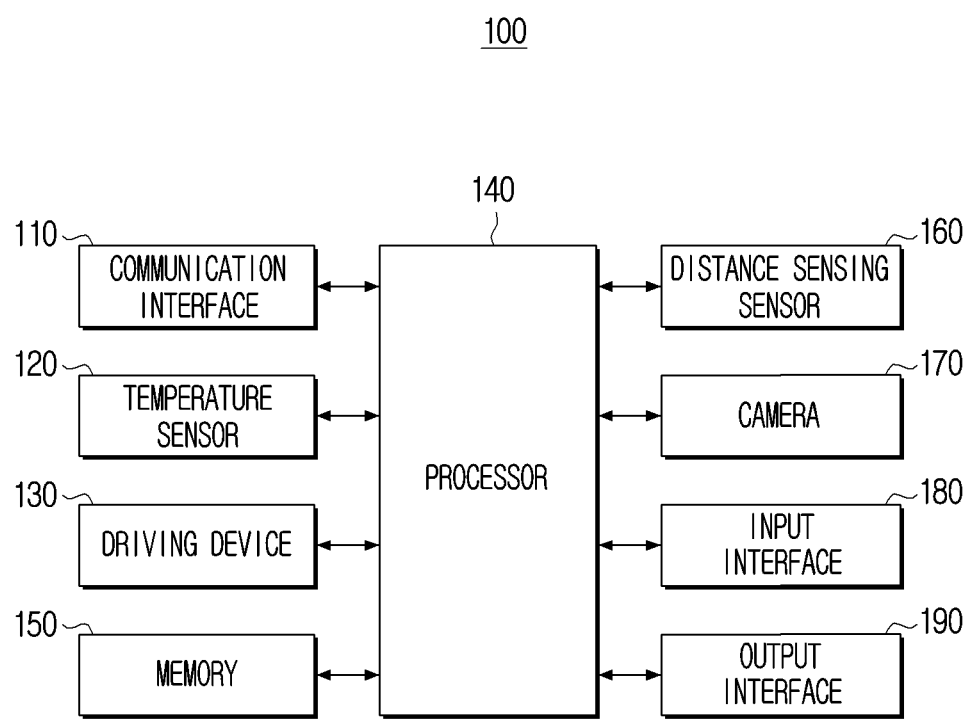
FIG. 6 is a block diagram illustrating a detailed configuration of a hood apparatus according to an embodiment.

FIG. 6 is a block diagram illustrating a detailed configuration of a hood apparatus according to an embodiment.

Referring to FIG. 6, the hood apparatus 100 may include a communication interface 110, a temperature sensor 120, a driving device 130, a processor 140, a memory 150, a distance sensing sensor 160, a camera 170, an input interface 180 and an output interface 190. A detailed description of a description overlapping with the configuration shown in FIG. 5 among the configuration shown in FIG. 6 will be omitted.

Various instructions, programs, or data required for an operation of the hood apparatus 100 or the processor 140 may be stored in the memory 150. In addition, the memory 150 may store sensing values acquired through sensors such as the temperature sensor 120, the distance sensing sensor 160, the camera 170, or the like.

The distance sensing sensor 160 may sense a distance between the temperature sensor 120 and each burner 220 of the cooking device 200.

In this case, the processor 140 may correct a sensing result sensed by the temperature sensor 120 according to the distance sensed by the distance sensing sensor 160. In the case of a non-contact temperature sensor 120, a sensing area for sensing a temperature may vary according to a distance from the temperature sensor 120 to a temperature measurement object. For example, as a distance to the temperature measurement object increases, the sensing area of the temperature sensor 120 becomes wider, and by calculating an average value of the temperature sensed in the entire sensing area as a sensing result, temperature sensing is performed even for an area outside a meaningful range in which the object exists, such that an accuracy of a sensing result value of the temperature sensor 120 may be reduced.

The processor 140 may correct the sensing result of the temperature sensor 120 by reflecting the distance to the burner sensed by the distance sensing sensor 160 to increase the accuracy of the sensing result. More specific explanation thereof will be made with reference to FIG. 9.

The camera 170 may acquire an image by photographing the cooking device 200. Specifically, the camera 170 may acquire an image in which a cooking container is arranged, an image in which cooking substance is arranged inside the cooking container, an image of the burner 220 in which nothing is arranged, or the like, by photographing an upper plate of the cooking device 200.

The processor 140 may identify a burner being driven from among the plurality of burners 220 of the cooking device 200 based on the image photographed by the camera 170, and control the driving device 130 such that a sensing direction of the temperature sensor 120 faces a position of the burner identified as being driven.

For example, the processor 140 may adjust the sensing direction of the temperature sensor 120 by identifying that a burner located at a place where the cooking container is arranged is being driven based on the image in which the cooking container is arranged (or the image in which the cooking substance is arranged inside the cooking container). In this case, the temperature sensor 120 may measure a preheating temperature of the cooking container or measure a temperature of the cooking substance by sensing a temperature of the cooking container (or cooking substance arranged inside the cooking container).

Also, the processor 140 may sense the temperature of the burner 220 based on the image of the burner 220 on which nothing is arranged. For example, whether the burner is driven through a brightness or color of the burner, and the temperature of the burner being driven may be measured.

The input interface 180 may receive various user commands. For example, the input interface 180 may receive a user command for controlling the hood apparatus 100 or a control command for performing communication with an external device.

The input interface 180 may be implemented as an operation panel that receives a user command through a button (or key) of the hood apparatus 100, a display that receives a user command through a touch screen, a microphone that receives the user's spoken voice, or the like.

The output interface 180 may include at least one of a display and a speaker. Here, the display is a device for outputting information in a visual form (e.g., text, image, etc.). The display may display an image frame in all or part of a display area. The display area may refer to an entire area in a pixel unit in which information or data is visually displayed. A speaker is a device that outputs information in an audible form (e.g., voice). The speaker may output various kinds of alarm sounds or voice messages in addition to various audio data on which various processing operations such as decoding, amplification, and noise filtering are performed by an audio processor.

According to an embodiment of the disclosure, the processor 140 may control the speaker or display to output a danger notification message when the sensing result exceeds a threshold temperature.

When the configuration included in the hood apparatus 100 described above is implemented as the temperature sensing device 300 of a type detachable to the hood apparatus 100 instead of the temperature sensor 120 being provided in the hood apparatus 100, it may be a configuration included in the temperature sensing device 300. For example, the temperature sensing device 300 may be implemented in the form of a module including elements such as a driving device, a distance sensing sensor, a camera, or the like, in addition to the elements shown in FIG. 3, and operate as a separate device from the hood apparatus 100.

Figure 7:
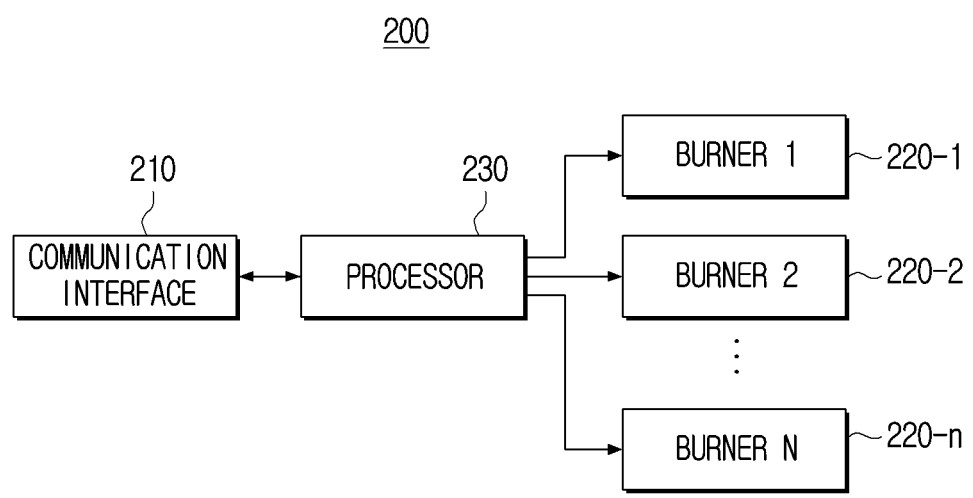
FIG. 7 is a block diagram illustrating a configuration of a cooking device according to an embodiment.

FIG. 7 is a block diagram illustrating a configuration of a cooking device according to an embodiment.

Referring to FIG. 7, the cooking device 200 may include a communication interface 210, a plurality of burners 220, and a processor 230.

A plurality of burners 220-1, 220-2, . . . , 220-n may be arranged on the upper plate of the cooking device 200 at different positions.

The communication interface 210 may communicate with an external temperature sensor to receive information on the temperature of the burner or transmit state information of the burner to the external temperature sensor.

The processor 230 may be electrically connected to the communication interface 210 and a plurality of burners 220 to control the overall operation of the cooking device 200. The processor 230 may control the communication interface 210 to transmit a control signal for controlling a temperature to be sensed in a direction toward a location of a burner being driven among the plurality of burners 220 to the external temperature sensor. In this case, when a sensing result is received from the external temperature sensor, the processor 230 may control a driving state of the burner being driven according to the sensing result. For example, when the temperature of the burner is lower than an object temperature based on the received sensing result, the temperature of the burner may be controlled to increase in order to achieve the object temperature. Meanwhile, when it is identified that the received sensing result is equal to or higher than the threshold temperature, the corresponding burner may be controlled to lower or turn off the corresponding temperature.

Also, the cooking device 200 may control a cooking operation performed in the cooking device 200 according to a sensing result received from the hood apparatus 100. For example, the cooking device 200 may control an intensity of flame power of the burner or control a cooking time according to a temperature value for each burner included in the sensing result. Also, the cooking device 200 may provide a preheating completion notification at a preheating completion time point according to a temperature value of a cooking container, that is, when the cooking container reaches a preheating object temperature. Furthermore, the cooking device 200 may provide a high temperature risk notification when the temperature value of the burner is equal to or greater than a threshold value after cooking is finished.

Meanwhile, the processor 230 may correct the sensing result according to a distance from the external temperature sensor, and control a driving state of the burner being driven based on the corrected sensing result.

Also, the cooking device 200 may include an output interface such as a speaker, a display, or the like, and may control the speaker or display to output a danger notification message when the corrected sensing result exceeds a threshold temperature.

Figure 8:
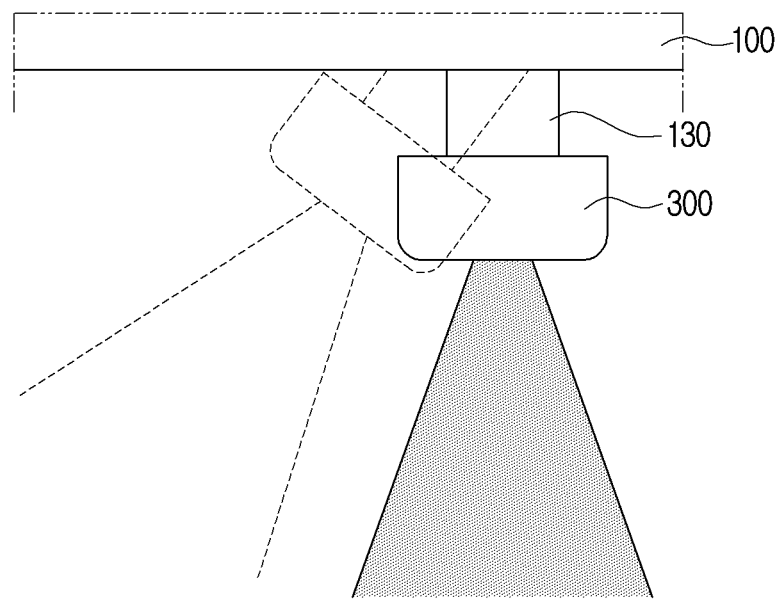
FIG. 8 is a view schematically illustrating a rotation operation of a temperature sensing device according to an embodiment.

FIG. 8 is a view schematically illustrating a rotation operation of a temperature sensing device according to an embodiment.

Referring to FIG. 8, the temperature sensing device 300 may be rotate by being connected to the driving device 130 included in the hood apparatus 100. The driving device 130 may adjust a sensing direction of the temperature sensing device 300 by rotating the temperature sensing device 300 forward, backward, left and right, or up and down through a driving source such as a motor.

However, the disclosure is not limited thereto, and the temperature sensing device 300 may adjust the sensing direction by rotating a temperature sensor provided in the temperature sensing device 300 through a driving device provided therein.

Figure 9:
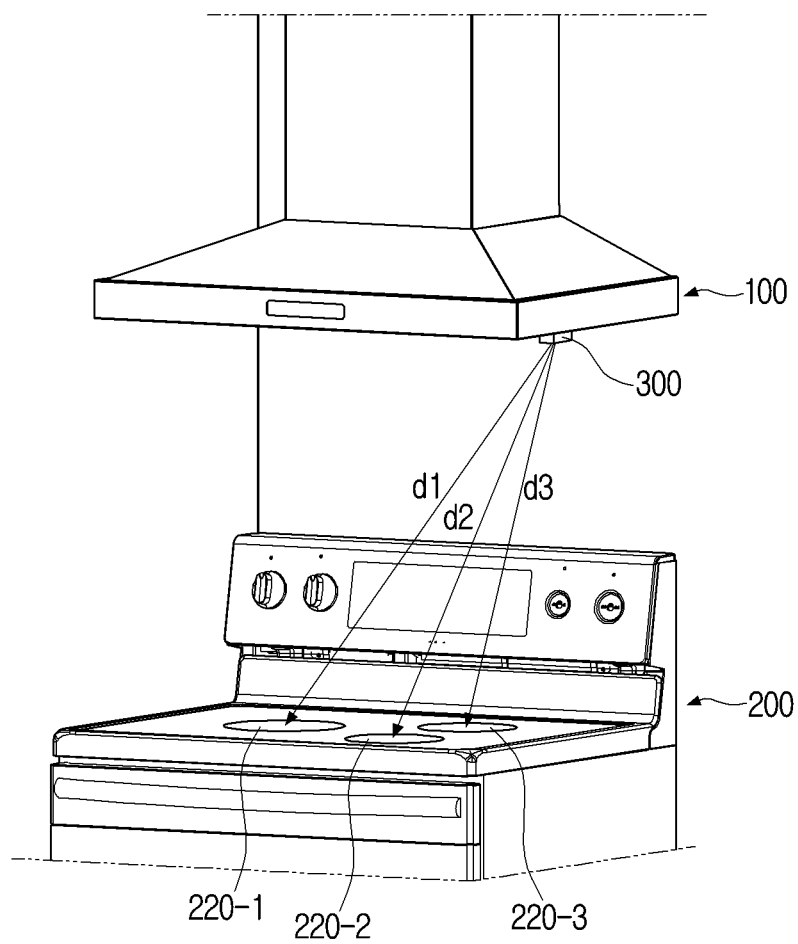
FIG. 9 is a view illustrating an operation in which a temperature sensing device senses a distance to each burner provided in a cooking device according to an embodiment.

FIG. 9 is a view illustrating an operation in which a temperature sensing device senses a distance to each burner provided in a cooking device according to an embodiment.

Referring to FIG. 9, a distance from the temperature sensing device 300 attached to the hood apparatus 100 to a plurality of burners 220-1, 220-2, and 220-3 arranged at different positions in the cooking device 200 may be different from each other. The temperature sensing device 300 may include a distance sensing sensor for sensing a distance to each burner. The temperature sensing device 300 may correct a sensing result according to a distance to the burner sensed by the distance sensing sensor. Accordingly, an accuracy of the measured temperature may be improved.

According to an embodiment of the disclosure, the cooking device 200 may receive a user command for selecting one of the plurality of burners as a temperature sensing object from the user, and transmit identification information of the selected burner to the temperature sensing device 300. The temperature sensing device 300 may adjust a sensing direction to face a position of the selected burner based on the received identification information of the burner. After the sensing direction is adjusted, the temperature sensing device 300 may acquire a distance value to the selected burner through the distance sensing sensor. Here, the distance sensing sensor may be arranged adjacent to the temperature sensor, and a distance value sensed by the distance sensing sensor may be referred to as a distance value from the temperature sensor to the burner. The temperature sensing device 300 may correct a sensing value sensed by the temperature sensor based on the acquired distance value. For example, since an area of the sensing area where the temperature value is sensed through the temperature sensor is proportional to a square of the distance from the temperature sensor, when an average value of the entire sensing area is measured as a temperature of a temperature measurement object, a temperature value may be calculated by applying a weight value that is inversely proportional to the square of the distance value.

Figure 10:
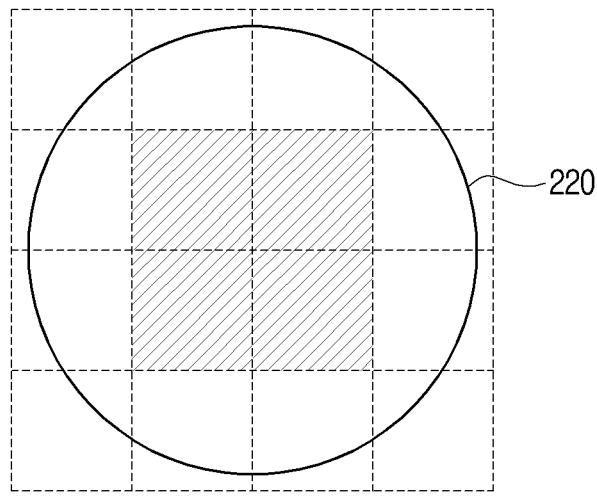
FIG. 10 is a view illustrating an example of a method of correcting a sensing result sensed by a temperature sensing device according to an embodiment.

FIG. 10 is a view illustrating an example of a method of correcting a sensing result sensed by a temperature sensing device according to an embodiment.

FIG. 10 is a view illustrating a division of a sensing area of the temperature sensing device 300 into 4×4 pixel areas with respect to one burner 220. The temperature sensing device 300 may determine a temperature value of a temperature sensing object by calculating an average value of sensing values for each of the entire pixel area. In this case, the temperature sensing device 300 may determine a temperature value of the temperature sensing object by calculating only the average value of the sensing values for the pixel area positioned in the center, not in the entire pixel area. This reflects that a center of the sensing area is a significant area when calculating the temperature value because temperature sensing objects arranged on the burner 220, such as a cooking container or cooking stance, are mainly arranged in the center of the burner 220. Meanwhile, the temperature value may be calculated by not only calculating the temperature value by excluding an edge area except the center, but also calculating the temperature value by reflecting the sensing value for the entire area, but calculating the temperature value by applying a greater weight value to a pixel area arranged in the center.

Figure 11:
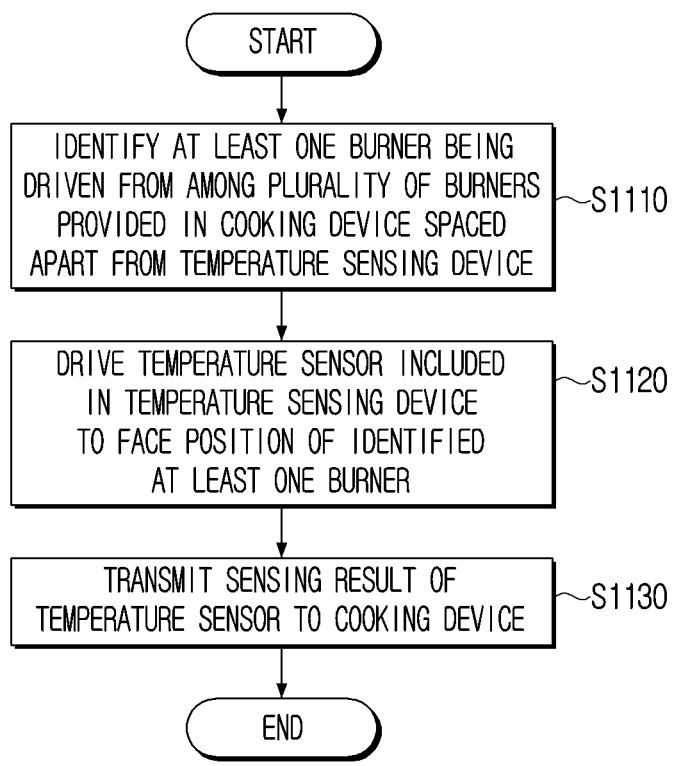
FIG. 11 is a flowchart illustrating a temperature sensing method according to an embodiment.

FIG. 11 is a flowchart illustrating a temperature sensing method according to an embodiment.

Referring to FIG. 11, a method of sensing a temperature of a temperature sensing device according to an embodiment of the disclosure includes identifying at least one burner being driven from among a plurality of burners provided in the cooking device spaced apart from the temperature sensing device (S1110), driving the temperature sensor included in the temperature sensing device to face a position of the identified at least one burner (S1120), and transmitting a sensing result of the temperature sensor to the cooking device (S1130).

The temperature sensing device may identify (S1110) at least one burner being driven from among the plurality of burners provided in the spaced apart cooking device.

In this case, the temperature sensing device may photograph the cooking device and identify the burner being driven from among the plurality of burners based on the photographed image.

Meanwhile, the temperature sensing device may receive information on driving states of the plurality of burners from the cooking device, and identify burners being driven based on the received information.

In addition, the temperature sensor included in the temperature sensing device may be driven to face a position of the identified at least one burner (S1120).

In this case, if the number of burners driven in the cooking device is greater than the number of temperature sensors included in the temperature sensing device, the temperature sensor may sequentially and repeatedly sense each of the driven burners.

The sensing result of the temperature sensor may be transmitted to the cooking device (S1130).

Meanwhile, the temperature sensing device may sense a distance to at least one burner being driven, and correct a sensing result sensed by the temperature sensor according to the sensed distance.

Meanwhile, computer instructions for performing processing operation according to various embodiments of the disclosure described above may be stored in a non-transitory computer readable medium. The computer instructions stored in the non-transitory computer-readable medium, when executed by the processor of a specific device, cause the specific device to perform the processing operation according to the various embodiments described above.

The non-transitory computer readable recording medium refers to a medium that stores data and that can be read by devices. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), or the like, and may be provided.

The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

The foregoing exemplary embodiments are merely exemplary and are not to be construed as limiting the disclosure. The disclosure can be readily applied to other types of apparatuses. Also, the description of exemplary embodiments are intended to be illustrative, and not to limit the scope of the claims and their equivalents, and many alternatives, modifications, and variations will be apparent to those skilled in the art.

What is claimed is:

1. A hood apparatus for a cooking device, comprising:
   at least one temperature sensor arranged in a direction of a cooking device including a plurality of burners;
   a communication interface to perform communication with the cooking device;
   a driving device configured to adjust a sensing direction of the at least one temperature sensor;
   a distance sensing sensor configured to sense a distance between the at least one temperature sensor and each of the plurality of burners of the cooking device; and
   a processor configured to:
      identify at least one burner being driven from among the plurality of burners;
      control the driving device to adjust the sensing direction of the at least one temperature sensor so that the at least one temperature sensor faces a position of the identified at least one burner;
      update a sensing result sensed by the at least one temperature sensor according to the distance sensed by the distance sensing sensor; and
      control the communication interface to transmit the updated sensing result of the at least one temperature sensor to the cooking device.

2. The hood apparatus of claim 1, further comprising a main body, and wherein the at least one temperature sensor is attachable to or detachable from the main body of the hood apparatus, and the main body of the hood apparatus includes at least one connector to fix the at least one temperature sensor thereto.

3. The hood apparatus of claim 1, further comprising:
   a camera to photograph the plurality of burners of the cooking device,
   wherein the processor is configured to identify the at least one burner being driven among the plurality of burners based on an image photographed by the camera, and control the driving device to adjust the sensing direction of the at least one temperature sensor to face the position of the identified at least one burner.

4. The hood apparatus of claim 1,
   wherein the processor is configured to receive information about a driving state of the plurality of burners from the cooking device through the communication interface, identify the at least one burner being driven based on the received information, and control the driving device to adjust the sensing direction of the at least one temperature sensor to face the position of the identified at least one burner.

5. The hood apparatus of claim 1, further comprising:
a speaker,
wherein the processor is configured to control the speaker to output a notification message in response to the updated sensing result being exceeding a threshold temperature.

6. The hood apparatus of claim 1, wherein the processor is configured to:
determine a number of the at least one burner being driven in the cooking device; and
control the driving device to adjust the at least one temperature sensor to sequentially and repeatedly sense each of the plurality of burners being driven in response to the determining that the number of the at least one burner being driven is a greater than a number of the at least one temperature sensor.

7. The hood apparatus of claim 1, wherein the at least one temperature sensor is an infrared temperature sensor.

8. The hood apparatus of claim 1, wherein the temperature sensing device is configured to divide a sensing area into pixel areas and determine a temperature value by calculating an average value of sensing values for the pixel area positioned in a center of the at least one burner.

9. A cooking device comprising:
a plurality of burners arranged in different positions;
a communication interface to perform communication with an external temperature sensor; and
a processor configured to:
identify at least one burner being driven among the plurality of burners;
control the communication interface to transmit a control signal to adjust a sensing direction of the external temperature sensor so that the external temperature sensor faces a position of the identified at least one burner, and to control, in response to receiving a sensing result from the external temperature sensor, a driving state of the identified at least one burner according to the sensing result; and
update the sensing result based on a distance between each of the plurality of burners and the external temperature sensor, and control the driving state of the burner being driven based on the updated sensing result.

10. The cooking device of claim 9, further comprising:
a speaker,
wherein the processor is further configured to control the speaker to output a notification message in response to the updated sensing result being exceeding a threshold temperature.

11. A temperature sensing method of a temperature sensing device of a hood apparatus, comprising:
identifying, by a processor, at least one burner being driven among a plurality of burners of a cooking device which is located apart from the temperature sensing device;
adjusting a temperature sensor of the temperatures sensing device to face a position of the identified at least one burner;
sensing a distance between the temperature sensor and the identified at least one burner;
updating a sensing result sensed by the temperature sensor according to the sensed distance; and
transmitting the updated sensing result of the temperature sensor to the cooking device.

12. The method of claim 11, further comprising:
photographing, by a camera of the temperature sensing device, the plurality of burners of the cooking device; and
the identifying comprising identifying the at least one burner being driven among the plurality of burners based on the photographing of the plurality of burners.

13. The method of claim 11, further comprising:
receiving information on driving states of the plurality of burners from the cooking device; and
the identifying comprising identifying the at least one burner being driven based on the received information.

14. The method of claim 11, further comprising:
determining a number of the at least one burner being driven in the cooking device; and
adjusting the at least one temperature sensor to sequentially and repeatedly sense each of the plurality of burners being driven in response to the determining that the number of the at least one burner being driven is a greater than a number of the at least one temperature sensor.

15. The method of claim 11, further comprising dividing a sensing area into pixel areas, and determining a temperature value by calculating an average value of sensing values for the pixel area positioned in a center of the at least one burner.

* * * * *